United States Patent
Heiskanen

(10) Patent No.: US 9,025,335 B2
(45) Date of Patent: May 5, 2015

(54) APPARATUS FOR MOVING A CARD READER

(75) Inventor: Juuso Juhani Heiskanen, Kaarina (FI)

(73) Assignee: Nokia Corporation, Espoo (FI)

( * ) Notice: Subject to any disclaimer, the term of this patent is extended or adjusted under 35 U.S.C. 154(b) by 313 days.

(21) Appl. No.: 13/459,433

(22) Filed: Apr. 30, 2012

(65) Prior Publication Data
US 2013/0286554 A1    Oct. 31, 2013

(51) Int. Cl.
*H05K 7/00*    (2006.01)
*G06K 7/00*    (2006.01)

(52) U.S. Cl.
CPC ..................................... *G06K 7/0021* (2013.01)

(58) Field of Classification Search
USPC ............ 361/725–730, 748, 756; 439/64, 159, 439/160, 188, 325, 630, 636
See application file for complete search history.

(56) References Cited

U.S. PATENT DOCUMENTS

| | | | |
|---|---|---|---|
| 5,468,079 A | 11/1995 | Murakoshi et al. ............ 400/521 |
| 5,655,917 A * | 8/1997 | Kaneshige et al. ............ 439/155 |
| 6,343,945 B1 | 2/2002 | Liikanen ........................ 439/160 |
| 7,066,748 B2 * | 6/2006 | Bricaud et al. ................. 439/159 |
| 7,108,524 B2 | 9/2006 | Wahler ........................... 439/159 |
| 7,210,950 B2 | 5/2007 | Tanaka et al. .................. 439/188 |
| 7,458,857 B2 * | 12/2008 | Lin et al. ........................ 439/630 |
| 7,713,091 B2 * | 5/2010 | Chen .............................. 439/630 |
| 7,794,232 B2 | 9/2010 | Ogatsu ............................. 439/64 |
| 8,553,419 B2 * | 10/2013 | Luo et al. ....................... 361/727 |
| 2002/0008142 A1 * | 1/2002 | Takayasu et al. ............. 235/441 |
| 2005/0191970 A1 | 9/2005 | Hasegawa .................... 455/90.3 |
| 2007/0128913 A1 | 6/2007 | Zuo et al. ....................... 439/325 |
| 2010/0210128 A1 | 8/2010 | Matsunaga ................... 439/159 |
| 2010/0248551 A1 | 9/2010 | Harada .......................... 439/636 |
| 2011/0249410 A1 | 10/2011 | Fujita et al. ................... 361/748 |

OTHER PUBLICATIONS

"9162 Slide-In SIM Card Connector", http://www.avx.com/docs/catalogs/9162-2.pdf, (pp. 17-20).
"Core77 Speaks With Jonathan Ive on the Design of the iPhone 4: Material Matters", http://www.core77.com/blog/object_culture/core77_speaks_with_jonathan_ive_on_the_design_of_the_iphone_4_material_matters_16817.asp, (Jun. 25, 2010), (21 pages).

* cited by examiner

*Primary Examiner* — Hung S Bui
(74) *Attorney, Agent, or Firm* — Harrington & Smith

(57) ABSTRACT

An apparatus including a sliding mechanism configured to enable a card holder to be moved between a first position and a second position; a resilient member configured to bias the card holder towards the first position; and an adjustment mechanism configured to enable tension in the resilient member to be adjusted when the card holder is in the second position.

14 Claims, 10 Drawing Sheets

APPARATUS FOR MOVING A CARD READER

TECHNOLOGICAL FIELD

Embodiments of the present disclosure relate to an apparatus for moving a card reader. In particular, they relate to an apparatus for moving a card reader in a device such as a communications device or other suitable electronic device.

BACKGROUND

Devices such as communications devices or other electronic devices which use cards and card readers are known. In such devices the card is inserted into a card holder. The device may be configured so that the card in the card holder can be aligned with the card reader within the device. The device and card holder may also be configured to enable the card holder to be aligned with the casing of the device.

BRIEF SUMMARY

According to various, but not necessarily all, embodiments there is provided an apparatus comprising: a sliding mechanism configured to enable a card holder to be moved between a first position and a second position; a resilient member configured to bias the card holder towards the first position; and an adjustment mechanism configured to enable tension in the resilient member to be adjusted when the card holder is in the second position.

In some embodiments the first position may be an open position.

In some embodiments the second position may be a closed position.

In some embodiments the apparatus may comprise a card holder.

In some embodiments the card holder may comprise an inner portion and an outer portion and the inner portion may be configured to receive a card and the outer portion may be configured to form part of the outer surface of a casing.

In some embodiments the adjustment mechanism may be configured so that when the card holder is in the second position the outer portion of the card reader forms a continuous surface with the outer surface of the casing.

In some embodiments the adjustment of the tension in the resilient member may enable the second position to be adjusted. The second position may be adjusted relative to a casing.

In some embodiments the adjustment mechanism may comprise a sliding mechanism.

In some embodiments the slider may be configured to be moved between a first position and a second position to adjust the tension in the resilient member.

In some embodiments the adjustment mechanism may comprise a ratchet mechanism.

According to various, but not necessarily all, embodiments there may also be provided a device comprising an apparatus as described above.

The device may be a communications device.

The apparatus may be for adjusting the position of a card reader in a device. The device may be for communications such as wireless communications.

BRIEF DESCRIPTION

For a better understanding of various examples of embodiments of the present disclosure reference will now be made by way of example only to the accompanying drawings in which.

DETAILED DESCRIPTION

Figure 1A:
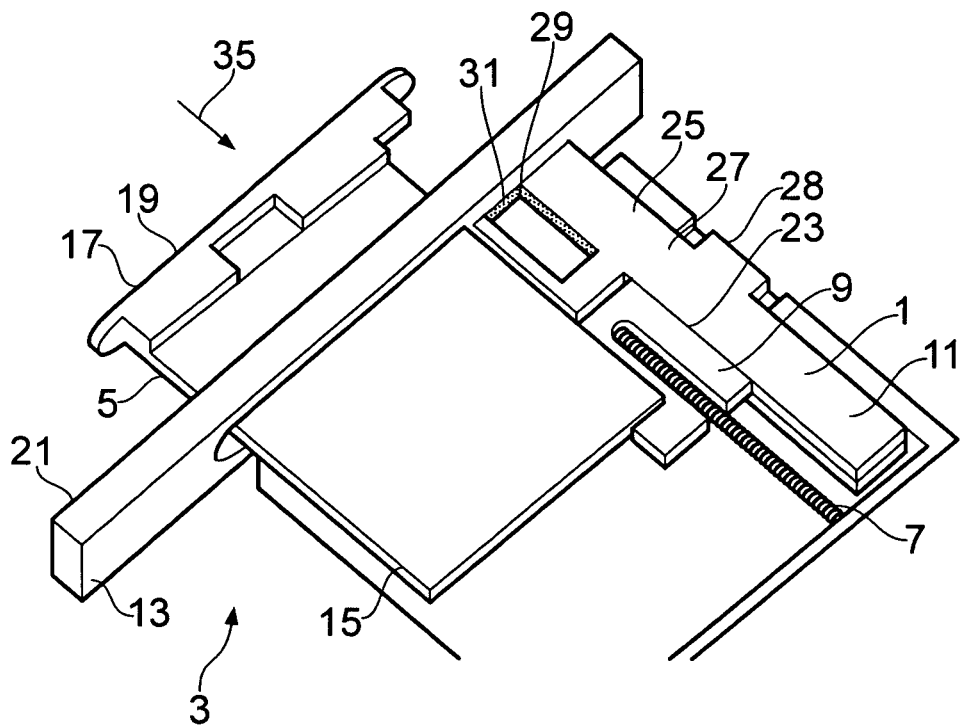
FIGS. 1A and 1B illustrate an apparatus according to embodiments of the disclosure.

The Figures illustrate an apparatus 1 comprising: a sliding mechanism 9 configured to enable a card holder 5 to be moved between a first position and a second position; a resilient member 7 configured to bias the card holder 5 towards the first position; and an adjustment mechanism 11 configured to enable tension in the resilient member 7 to be adjusted when the card holder 5 is in the second position.

Figure 1B:
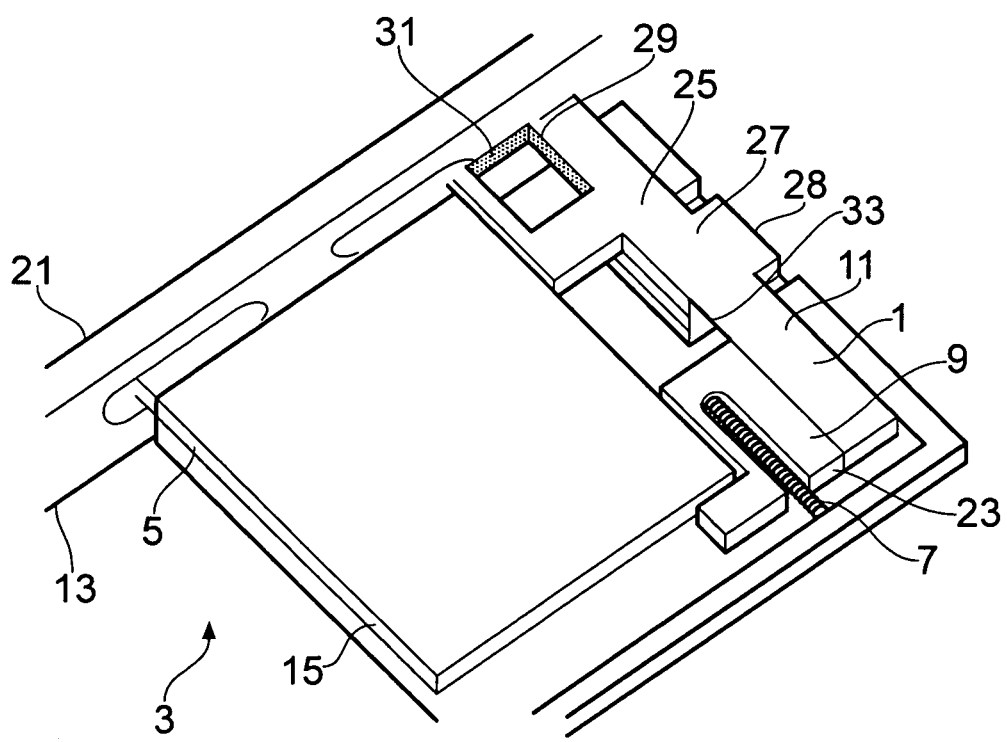

FIGS. 1A and 1B illustrate an apparatus 1 according to embodiments of the disclosure. The apparatus 1 comprises a mechanism for moving a card holder 5 between a first position and a second position. The first position may be an open position or a partially open position as illustrated in FIG. 1A. The second position may be a closed position as illustrated in FIG. 1B.

The examplary apparatus 1 illustrated in FIGS. 1A and 1B comprises a sliding mechanism 9 and an adjustment mechanism 11. The sliding mechanism 9 and adjustment mechanism 11 may be configured to control the position of a card holder 5. The apparatus 1 and card holder 5 may be contained within a device 3. The device 3 may be an electronic device such as a wireless communications device or any other suitable device.

In the examplary embodiment illustrated in FIGS. 1A and 1B the device 3 comprises a casing 13. The casing may 13 provide an external housing for the device 3. Only a portion of the casing 13 is illustrated in FIGS. 1A and 1B for clarity. It is to be appreciated that the casing 13 may enclose the apparatus 1 and the card holder 5.

The components of the apparatus 1 and device 3, which are illustrated in FIGS. 1A and 1B may be contained within the casing 13. The casing 13 may provide protection for the components of the device 3. For example, the casing 13 may protect the components of the device 3 from atmospheric conditions such as moisture or temperature variations. The casing 13 may also be configured to protect the components of the device 3 from mechanical shocks.

In the examplary embodiment of FIGS. 1A and 1B the card holder 5 may comprise an inner portion 15 and an outer portion 17. The inner portion 15 may be configured so that when the card holder 5 is located in the second, closed position, as illustrated in FIG. 1B, the inner portion 15 is located within the casing 13 of the device 3. In some embodiments the inner portion 15 of the card holder may be entirely located within the casing 13 of the device 3.

The inner portion 15 of the card holder 5 may be configured to receive a card. For example, the inner portion 15 of the card holder 5 may be sized and shaped so as to receive a card such as a memory card. The inner portion 15 of the card holder 5 may also comprise means for securing the card within the card holder 5.

The outer portion 17 of the card holder 5 may be configured so that when the card holder 5 is in the second closed position, as illustrated in FIG. 1B, the outer portion 17 of the card holder forms part of the casing 13 of the device 3. In the particular embodiment of FIGS. 1A and 1B the surface 19 of the outer portion 17 of the card holder 5 may form part of the surface 21 of the casing 13. The surface 19 of the outer portion 17 of the card holder 5 may be level with the surface 21 of the casing 13 so that the two surfaces 19, 21 are at the same height. This may enable the two surfaces 19, 21 to form a continuous plane.

The apparatus 1 comprises means for moving the card holder 5. The apparatus 1 may comprise any means which enables the card holder 5 to be moved between an open position as illustrated in FIG. 1A and a closed position as illustrated in FIG. 1B. The examplary apparatus 1 illustrated in FIGS. 1A and 1B comprises a first sliding mechanism 9 and an adjustment mechanism 11. In this particular examplary embodiment the adjustment mechanism 11 comprises a second sliding mechanism 25. It is to be appreciated that other means for moving the card holder 5 could be used in other embodiments of the disclosure.

In the examplary embodiments illustrated in FIGS. 1A and 1B the first sliding mechanism 9 comprises a first sliding portion 23. The first sliding portion 23 is configured to couple to a first slide rail so that the first sliding portion 23 may move along the slide rail between a first position and a second position. In the examplary embodiments of FIGS. 1A and 1B the first position is an open position or a partially open position and the second position is a closed position.

The first sliding portion 23 may be configured to abut or couple to the card holder 5 so that movement of the first sliding portion 23 along the slide rail causes movement of the card holder 5. The first sliding portion 23 may also be coupled to or abut card holder 5 so that movement of the card holder 5 causes movement of the first sliding portion 23.

The apparatus 1 also comprises a resilient member 7. In the examplary embodiment illustrated in FIGS. 1A and 1B the resilient member 7 comprises a spring. It is to be appreciated that, in other embodiments of the disclosure any other suitable means could be used instead.

The resilient member 7 may be coupled to the first sliding mechanism 9. The resilient member 7 may be coupled to the first sliding portion 9 so that a force such as an elastic force within the resilient member 7 may enable movement of the first sliding portion 23.

The resilient member 7 may also be coupled to the casing 13 of the device 3 so that the forces within the resilient member 7 enable movement of the first sliding portion 23 relative to the casing 13 of the device 3.

The resilient member 7 may be configured to bias the first sliding portion 23 and card holder 5 towards the first, open position. For example, in the embodiment illustrated in FIGS. 1A and 1B the spring is compressed when the apparatus 1 is in the second closed position. The compressed spring is applying a force to the sliding portion 23 which will push the sliding portion 23 toward the open position. In the examplary embodiment of FIG. 1B a locking mechanism 29 prevents the resilient member 7 from causing the sliding portion 23 to be returned to the open position.

The apparatus 1 illustrated in the examplary embodiments of FIGS. 1A and 1B also comprises an adjustment mechanism 11. The adjustment mechanism 11 may comprise any means which may be configured to adjust tension in the resilient member 7. The adjustment mechanism 11 may be configured to enable the tension in the resilient member 7 to be adjusted when the card holder 5 is in the second, closed position as illustrated in the examplary embodiment of FIG. 1B. The tension in the resilient member 7 may be adjusted by adjusting the compression of the resilient member 7. The adjustment of the compression of the resilient member may be achieved by making adjustments to the position of the first sliding portion 23 of the first sliding mechanism.

In the examplary embodiments of FIGS. 1A and 1B the adjustment mechanism comprises a second sliding mechanism 25. The second sliding mechanism 25 comprises a second sliding portion 27. The second sliding portion 27 may configured to couple to a second slide rail so that the second sliding portion 27 may move along the slide rail between two positions. The second slide rail may be comprised within the casing 13 of the device 3 to enable the second sliding mechanism 25 to move relative to the casing 13 of the device 3.

In the examplary embodiment of FIGS. 1A and 1B the second sliding portion 27 comprises a single member which may be positioned adjacent to the first sliding portion 23. In other embodiments of the disclosure the second sliding portion 27 may have a different configuration, for example it may comprise a plastic housing within the casing 13 of the device 3.

The second sliding portion 27 may comprise means 28 for enabling the second sliding portion 27 to be moved along the second slide rail by a user of the device 3. The means 28 may enable the second sliding portion 27 to be moved along the second slide rail when the device 3 is being assembled.

The second sliding portion 27 may be coupled to the first sliding mechanism 9. In the examplary embodiments of FIGS. 1A and 1B the second sliding portion 27 may comprise the first slide rail along which the first sliding portion 23 moves. Therefore in the examplary embodiment of FIGS. 1A and 1B the first sliding portion 23 is mounted on the second sliding portion 27. In such embodiments movement of the second sliding portion, relative to the casing 13 of the device 3 also causes movement of the first sliding portion 23 relative to the casing 13 of the device 3.

The apparatus 1 may also comprise a locking mechanism 29. In the embodiment illustrated in FIGS. 1A and 1B the locking mechanism 29 is coupled to the adjustment mechanism 11. The locking mechanism 29 may comprise a locking pin 31 and a locking plate 33. The locking pin 31 may be configured to enable movement of the locking plate in response to a user actuation.

The locking plate 33 provides a projection which may be moved between a locked position and an unlocked position. In FIG. 1A the locking plate 33 is in an unlocked position and the first sliding portion 23 has moved freely along the first slide rail to the open position.

In FIG. 1B the locking plate 33 is in the locked position. The locking plate projects over the first slide rail and prevents the first sliding portion 23 from moving along the slide rail. This is holding the sliding mechanism 9 and the card holder 5 in the closed position and resisting the forces applied to the first sliding portion 23 by the resilient member 7.

The locking mechanism 29 may be coupled to the adjustment mechanism 11 so that the locking mechanism 29 may prevent movement of the first sliding portion 23 relative to the second sliding portion 27 but does not prevent movement of the second sliding portion 27 relative to the casing 13 of the device 3.

Embodiments of the disclosure, as described above, provide an apparatus 1 which enables the position of a card holder 5 to be adjusted. In some embodiments of the disclosure the apparatus 1 may enable precise adjustments to be made to the position of the card holder 5.

The first sliding mechanism 9 may be used to enable the card holder 5 to be moved between the open and closed positions. The resilient member 7 may be configured to bias the card holder 5 towards an open or partially open position. If the card holder 5 is pushed to a partially open position by the resilient member 7 then a user of the device 5 may be able to apply a manual force to pull the card holder 5 to a fully open position. Once the card holder 5 is fully open a card may be inserted into the card holder 5.

A user of the device 3 may force the card holder 5 from the partially open position illustrated in FIG. 1A to the closed position illustrated in FIG. 1B by applying a force in an inwards direction as indicated by the arrow 35. This compresses the resilient member 7 and so increases the elastic forces stored in the resilient member 7. The locking plate 33 locks the sliding mechanism in the closed position and prevents the movement of the first sliding portion 23 towards the open position.

The adjustment mechanism 11 allows for adjustment of the tension within the resilient member 7. In the examplary embodiment of FIGS. 1A and 1B the sliding mechanism can be moved to either increase or decrease the compression of the resilient member 7. This increases or decreases the tension in the resilient member 7. This enables the position of the first sliding mechanism 23 and the card holder 5 to be adjusted when the first sliding mechanism 23 and the card holder 5 are in the closed position.

Embodiments of the disclosure may provide a simple mechanism which may enable the closed position of the card holder 5 to be adjusted. In some embodiments of the disclosure the adjustment of the closed position of the card holder 5 may enable the surface 19 of the outer portion 17 of the card holder 5 to be aligned with the surface 21 of the casing of the device 3 so that the two surfaces 19, 21 are level with each other. This may enable the two surfaces 19, 21 to form a continuous surface. In some embodiments of the disclosure the adjustment of the closed position of the card holder 5 may also enable the card holder 5 to be aligned with the contact points of a card reader within the device 3.

Figure 2:
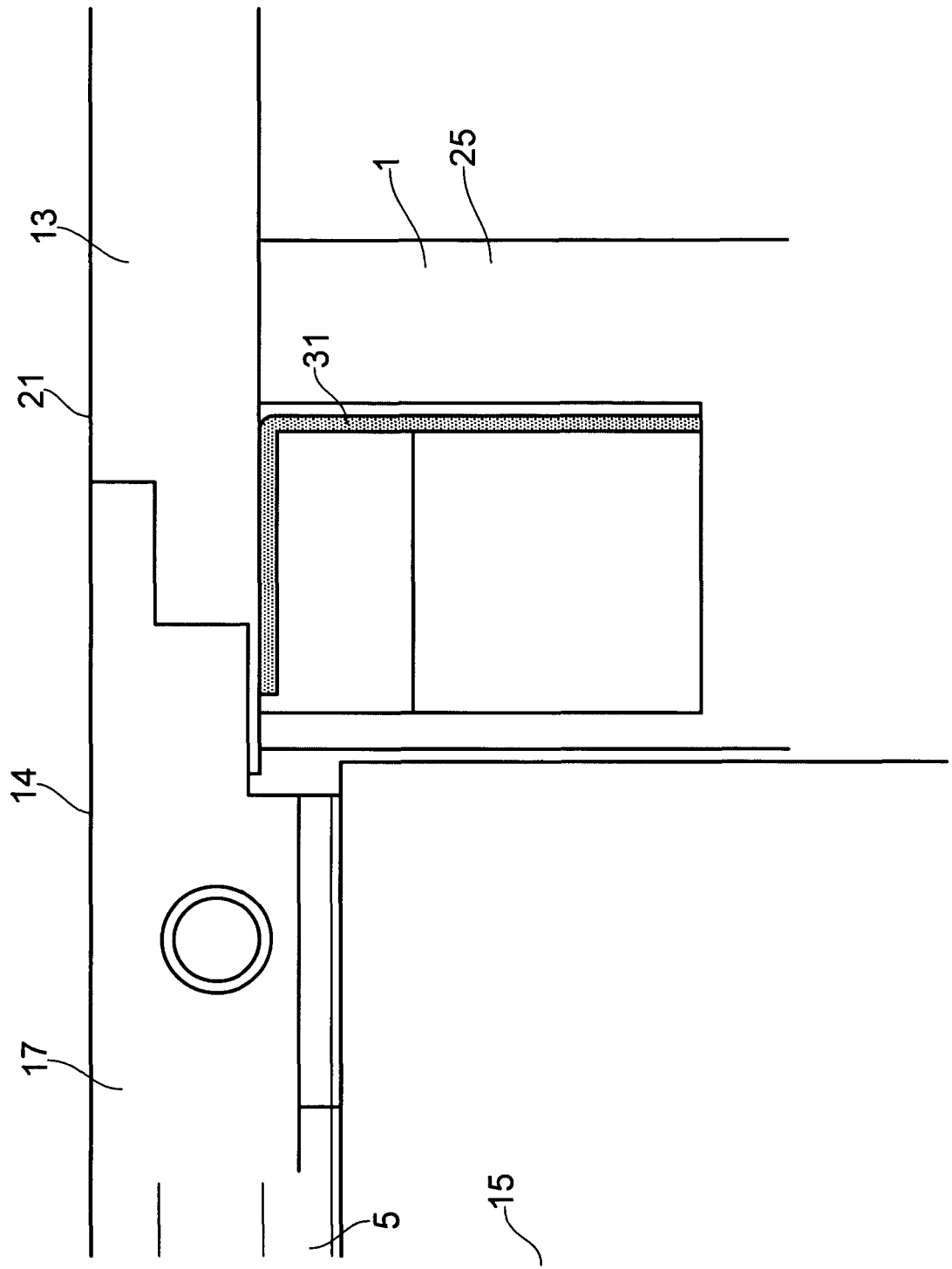
FIG. 2 illustrates a section of an apparatus and device according to an embodiment of the disclosure.

FIG. 2 illustrates a section of an apparatus 1 and device 3 according to an embodiment of the disclosure. The section illustrated in FIG. 2 shows a section of the apparatus 1 illustrated in FIGS. 1A and 1B in a closed position. The reference numerals used in FIGS. 1A and 1B are also used in FIG. 2.

In the examplary embodiment illustrated in FIG. 2 the adjustment mechanism 11 has been used to control the position of the first sliding portion 23 and the card holder 5 so that the surface 19 of the outer portion 17 of the card holder 5 and the surface 21 of the casing of the device 3 are level with each other. In the particular embodiment illustrated in FIG. 2 the two surfaces 19 and 21 form a continuous plane without and protrusions or indentations around the boundary of the outer portion 17 of the card holder 5. This may enable a smooth continuous surface to be provided to the casing 13 of the device 13. This may provide added protection to the card holder or card reader, for example it may reduce the likelihood of fluid ingress into the casing 13. It may also provide a more aesthetically pleasing casing 13 of the device 13.

In the examplary embodiment illustrated in FIG. 2 both the casing 13 and the outer portion 17 of the card reader are aligned with the same portion of the adjustment mechanism 11. As both the casing 13 and the card reader 5 are aligned with the same portion this reduces the likelihood of misalignment due to limitations on the manufacturing and tolerances of the device 13.

Figure 3A:
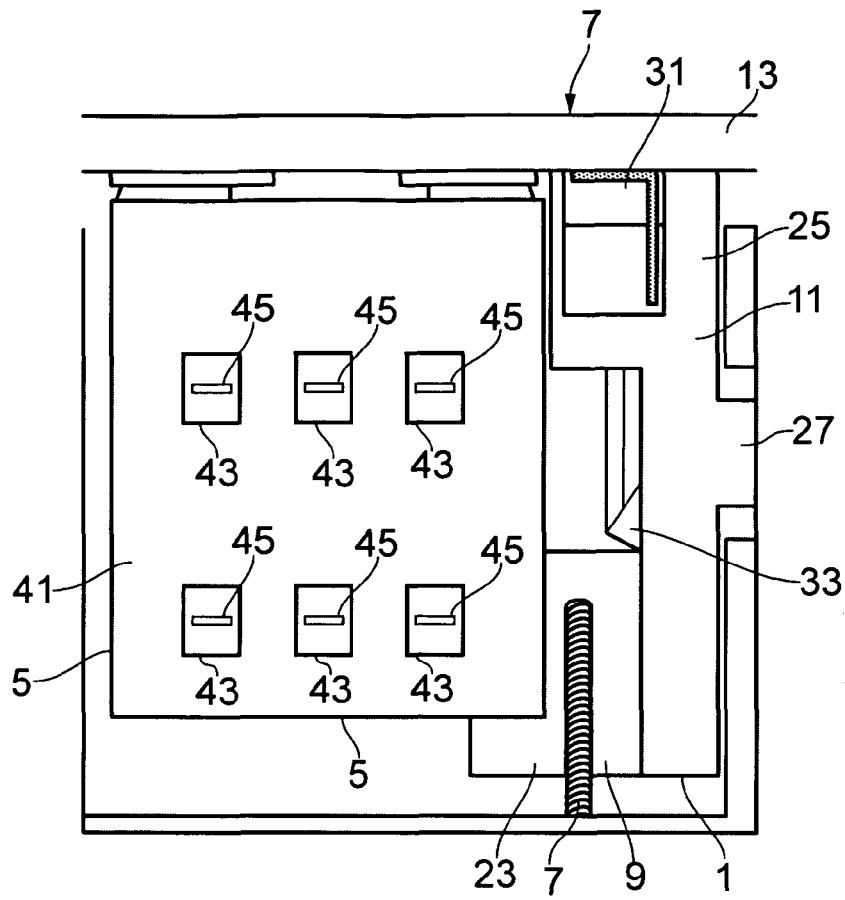
FIGS. 3A to 3C illustrate an apparatus and device according to another embodiment of the disclosure.
Figure 3B:
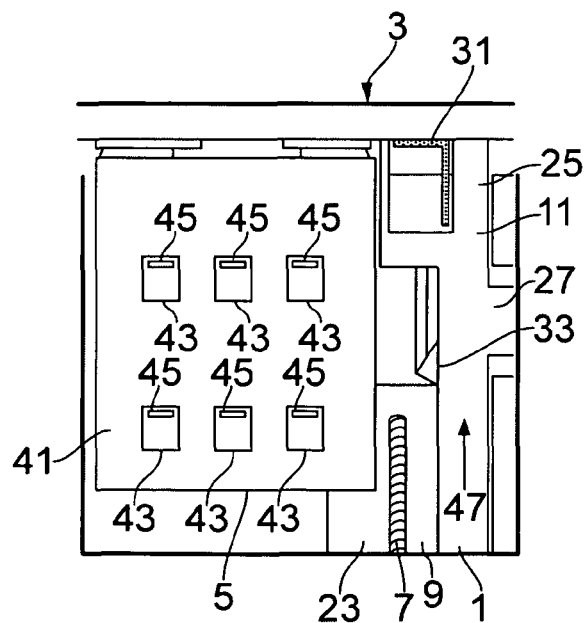
Figure 3C:
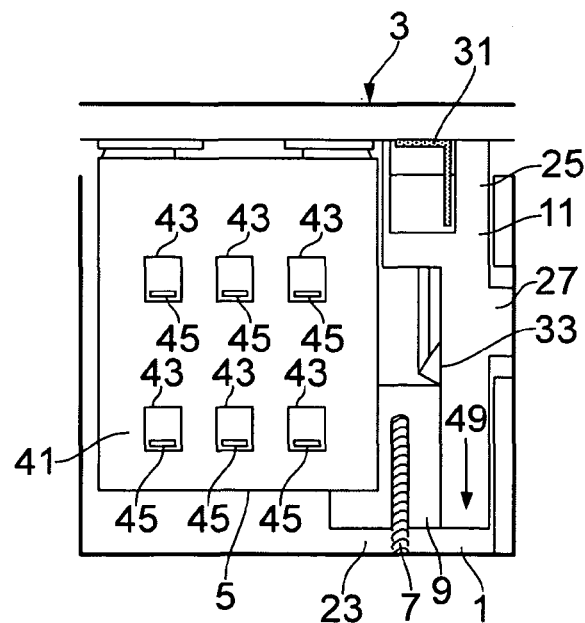

FIGS. 3A to 3C illustrate an apparatus 1 and device 3 according to another embodiment of the disclosure. FIGS. 3A to 3C illustrate an apparatus 1 as illustrated in FIGS. 1A and 1B and 2 in a closed position. The reference numerals used in FIGS. 1A and 1B and FIG. 2 are also used in FIGS. 3A to 3C.

In FIGS. 3A to 3C the adjustment mechanism 11 has been used to adjust the position of the card holder 5 and the alignment of a card 41 within the card holder 5 with the contact points 45 of a card reader.

In FIGS. 3A to 3C a card 41 has been inserted into the card holder 5 and the card holder 5 has been moved into the closed position. The card 41 may be entirely contained within the casing 13 of the device 13.

In order to enable information to be transferred between the device 3 and the card 41 it is beneficial for the contact pads 43 on the card 41 to be aligned with the contact points 45 of the card reader. The contact points 43 of the card reader may be fixed relative to the casing 13 of the device 3. In order to ensure alignment of the contact pads 43 on the card 41 and the contact points 45 of the card reader it may be beneficial to adjust the position of the card holder 5 using the adjustment mechanism 11.

In FIG. 3A the card 41 is located in a suitable position where the contact points 45 of the card reader are aligned with the middle of the contact pads 43 of the card 41. In this particular configuration the second sliding portion 27 is located midway between the two extreme positions. In some embodiments the second sliding portion 27 may be located so that it is equidistant or approximately equidistant from the two extreme positions. This configuration enables a reliable electrical connection to be established between the card 41 and the card reader. It is to be appreciated that in other embodiments the second sliding portion 27 may be located at any point between the two extreme positions.

In FIG. 3B the card 41 is located in a position where the contact points 45 of the card reader are aligned with the top of the contact pads 43 of the card 41. In this particular configuration the second sliding portion 27 is located at the lowest end of the second sliding rail positions. The electrical connection which is established between the card 41 and the card reader in the configuration illustrated in FIG. 3B might not be as reliable as the electrical connection which could be established with the configuration illustrated in FIG. 3A. To improve the electrical connection the second sliding portion may be moved along the second slide rail towards the direction indicated by the arrow 47.

In FIG. 3C the card 41 is also located in a position where the contact points 45 of the card reader are aligned with the bottom of the contact pads 43 of the card 41. In this particular configuration the second sliding portion 27 is located at the upper end of the second sliding rail position. The electrical connection which is established between the card 41 and the card reader in the configuration illustrated in FIG. 3C might not be as reliable as the electrical connection which could be established with the configuration illustrated in FIG. 3A. To improve the electrical connection the second sliding portion may be moved along the second slide rail towards the direction indicated by the arrow 49. This is an opposite direction to the direction indicated in FIG. 3B.

Figure 4A:
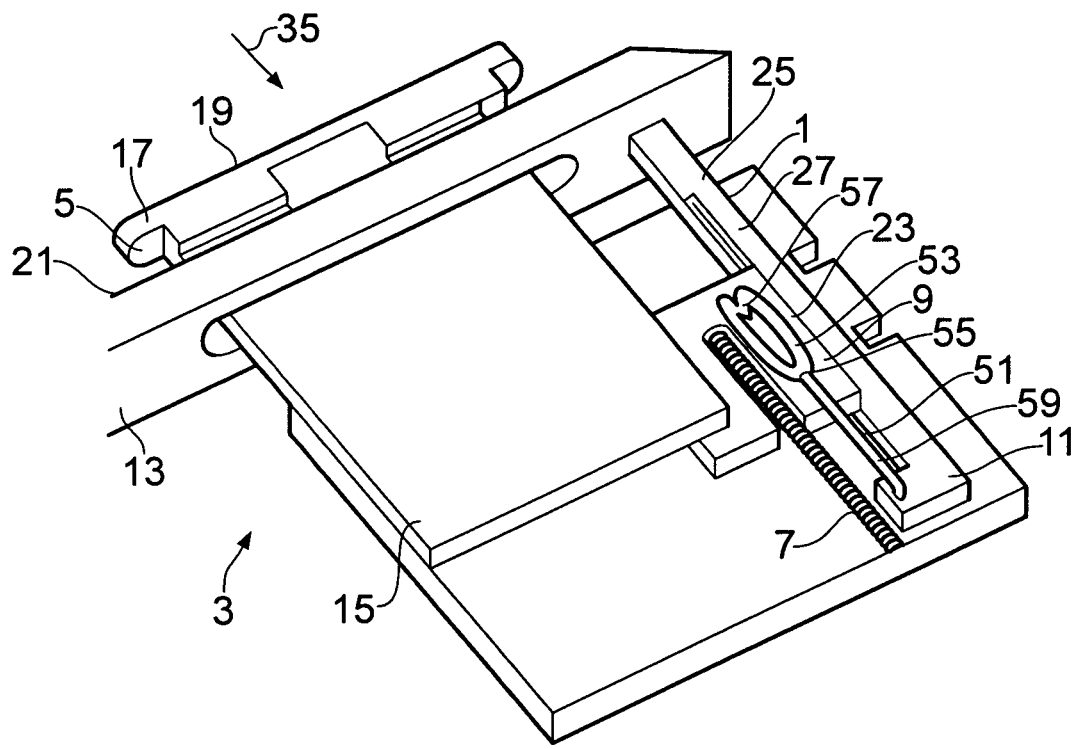
FIGS. 4A and 4B illustrate an apparatus according to another embodiment of the disclosure.
Figure 4B:
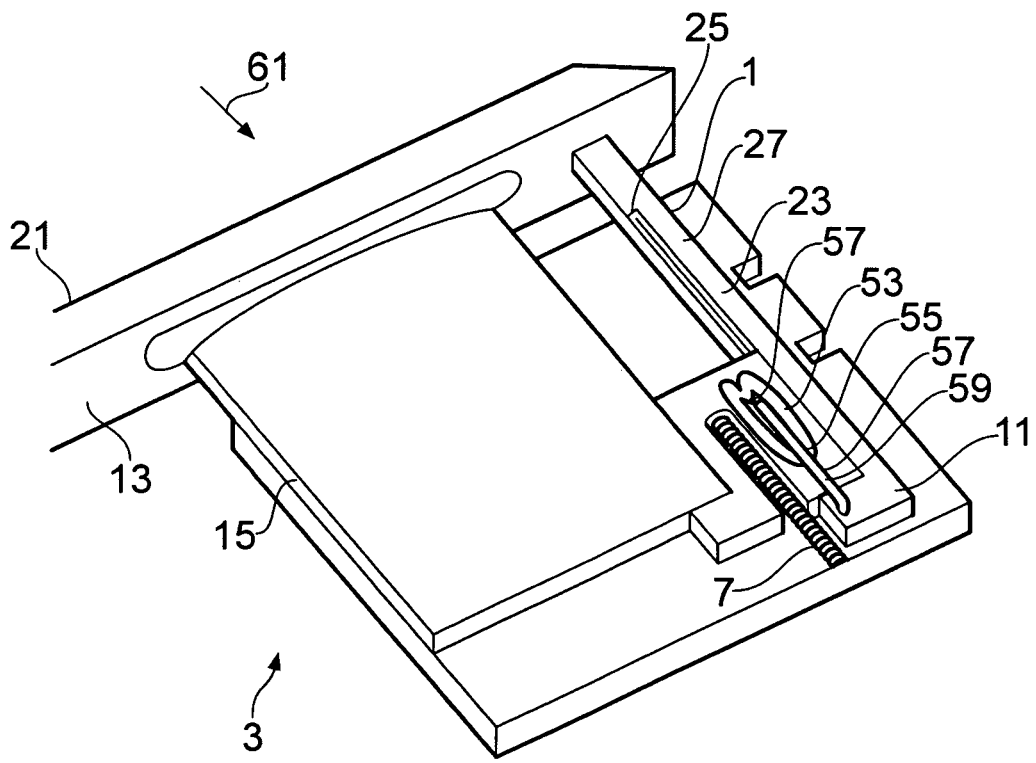

FIGS. 4A and 4B illustrate an apparatus 1 according to another embodiment of the disclosure. As with the embodiments illustrated in FIGS. 1 to 3 and described above the apparatus 1 comprises a mechanism configured to move a card holder 5 between a first position and a second position. The first position may be an open position or a partially open position as illustrated in FIG. 1A and described above. The second position may be a closed position as illustrated in FIG. 1B and described above.

The examplary apparatus 1 illustrated in FIGS. 4A and 4B is similar to the examplary apparatus illustrated in FIGS. 1 to 3 and described above and so the same reference numerals are used to refer to corresponding features. The examplary apparatus 1 illustrated in FIGS. 4A and 4B also comprises a sliding mechanism 9 and an adjustment mechanism 11 where the sliding mechanism 9 and adjustment mechanism 11 may be configured to control the position of a card holder 5. The apparatus 1 and card holder 5 may be contained within the casing 13 of a device 3 and the device 3 may be an electronic device such as a wireless communications device or any other suitable device.

The apparatus 1 illustrated in the examplary embodiments of FIGS. 4A and 4B comprises a first sliding mechanism 9, an adjustment mechanism 11 and a resilient member similar to the apparatus 1 described above in relation to FIGS. 1A and 1B. The adjustment mechanism 11 in the examplary embodiments of FIGS. 4A and 4B also comprises a second sliding mechanism 25 similar to the second sliding mechanism 25 described above in relation to FIGS. 1A and 1B.

The embodiment illustrated in FIGS. 4A and 4B differs from the embodiment illustrated in FIGS. 1A and 1B in that in the embodiment of FIGS. 4A and 4B a locking mechanism 51 is provided on the first sliding portion 23 rather than on the adjustment mechanism 11.

In this examplary embodiment the locking mechanism 51 comprises a locking member 59 which is configured to fit into a recessed portion 53 of the first sliding portion 23. The recessed portion 53 is shaped so as to comprise a first locking position 55 and a second locking position 57. The recessed portion 53 is also shaped to enable the locking member 59 to move between the first locking position 55 and the second locking position 57. The locking member 59 is coupled to the first sliding portion 23 and the second sliding portion 27 so that when the locking member 59 is in one of the locking positions the first sliding portion 23 cannot move relative to the second sliding portion 27.

In the examplary embodiment illustrated in FIG. 4A the apparatus 1 is configured so that the card holder 5 is positioned in a partially open position, as described above in relation to FIG. 1A. In this configuration the locking member 59 is located in the first locking position 55. This allows the first sliding portion 23 to be pushed outward towards the open configuration.

In the examplary embodiment illustrated in FIG. 4B the apparatus 1 is configured so that the card holder 5 is positioned in a closed position, as described above in relation to FIG. 1B. A user of the device 3 may cause the card holder 5 to be moved from the partially open position illustrated in FIG. 4A to the closed position illustrated in FIG. 4B by applying a force in an inwards direction as indicated by the arrow 35. This compresses the resilient member 7 and increases the elastic forces stored in the resilient member 7. This also forces the locking member 59 along the recessed portion to the second locking position 57.

In the examplary embodiment of FIGS. 4A and 4B a user may release the locking member 59 from the second locking position by applying a force in the inward direction as indicated by arrow 61. Once the locking member 59 has been released the compressed resilient member 7 will cause an outwards force to be applied to the sliding member 23 and push the first sliding portion 23 and the card reader 5 to an open or partially open position so as to return the apparatus 1 and device 3 to the configuration illustrated in FIG. 4A.

Figure 5:
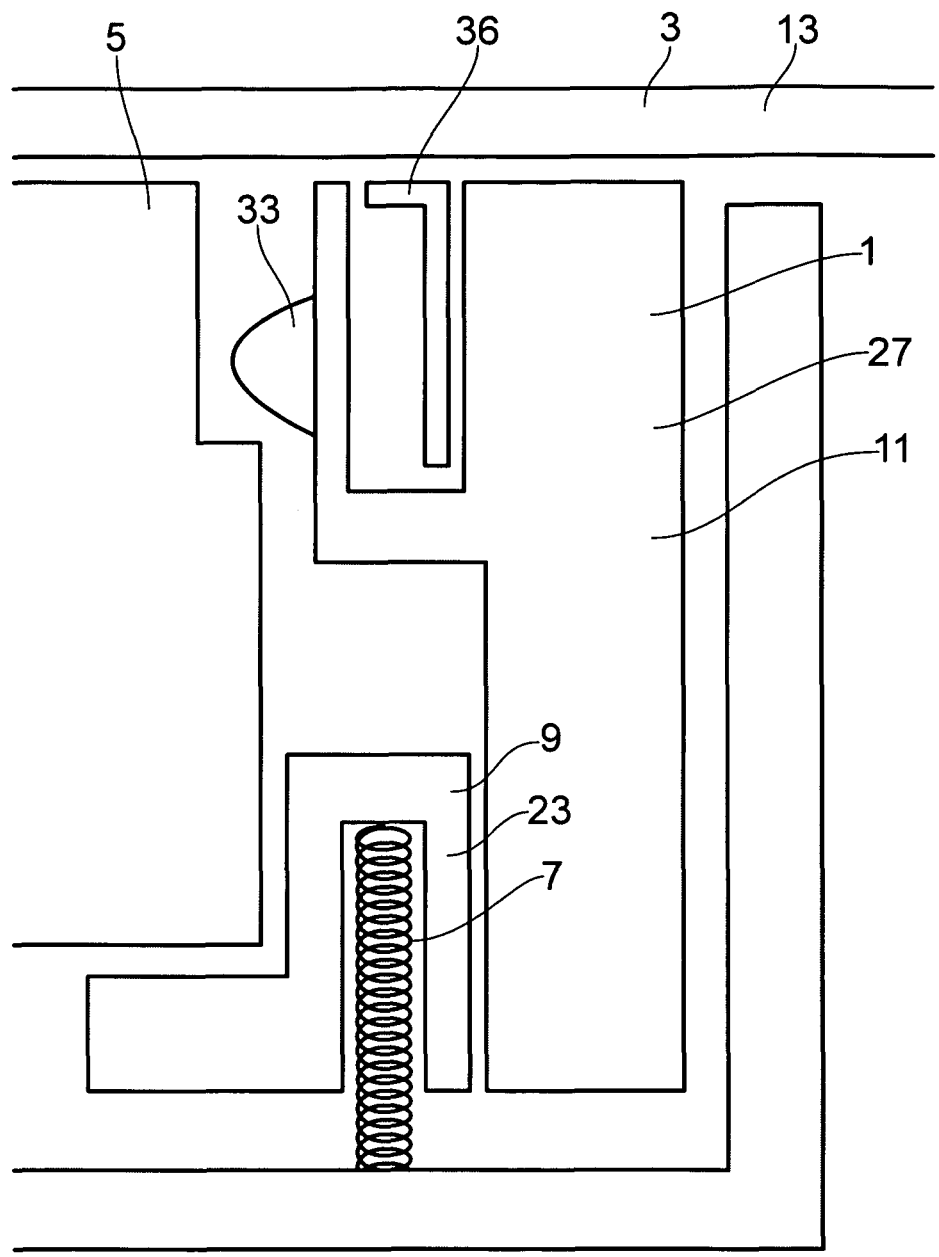
FIG. 5 illustrates an apparatus according to another further embodiment of the disclosure.

FIG. 5 illustrates another apparatus 1 according to another examplary embodiment of the disclosure. As with the embodiments illustrated in FIGS. 1A to 4B and described above the apparatus 1 comprises a mechanism configured to move a card holder 5 between a first position and a second position. The first position may be an open position or a partially open position as illustrated in FIG. 1A and described above. The second position may be a closed position as illustrated in FIG. 1B and described above.

The examplary apparatus 1 illustrated in FIG. 5 is similar to the examplary apparatus illustrated in FIGS. 1A to 4B and described above and so the same reference numerals are used to refer to corresponding features. The examplary apparatus 1 illustrated in FIG. 5 also comprises a sliding mechanism 9 and an adjustment mechanism 11 where the sliding mechanism 9 and adjustment mechanism 11 may be configured to control the position of a card holder 5. The apparatus 1 and card holder 5 may be contained within the casing 13 of a device 3 and the device 3 may be an electronic device such as a wireless communications device or any other suitable device.

The apparatus 1 illustrated in FIG. 5 comprises a locking mechanism 29. In the examplary embodiment illustrated in FIG. 5 the locking mechanism 29 is coupled to the adjustment mechanism 11. The locking mechanism 29 may comprise a locking pin 31 and a locking plate 33. The locking pin 31 may be configured to enable movement of the locking plate in response to a user actuation.

The locking plate 33 provides a projection which may be moved between a locked position and an unlocked position. In FIG. 1A the locking plate 33 is in an unlocked position and the first sliding portion 23 has moved freely along the first slide rail to the open position.

In the examplary embodiment illustrated in FIG. 5 the locking plate 33 is in the locked position and projects against the card holder 5. The card holder may comprise a ridged portion 10 which abuts the locking plate 33. The locking plate 33 is configured to prevent the card holder 5 from being moved to the open position. This may also prevent the first sliding portion 23 from moving along the slide rail. This is holding the sliding mechanism 9 and the card holder 5 in the closed position and resisting the forces applied to the first sliding portion 23 by the resilient member 7.

The locking mechanism 29 may be coupled to the adjustment mechanism 11 so that the locking mechanism 29 may prevent movement of the first sliding portion 23 relative to the second sliding portion 27 but does not prevent movement of the second sliding portion 27 relative to the casing 13 of the device 3.

Figure 6:
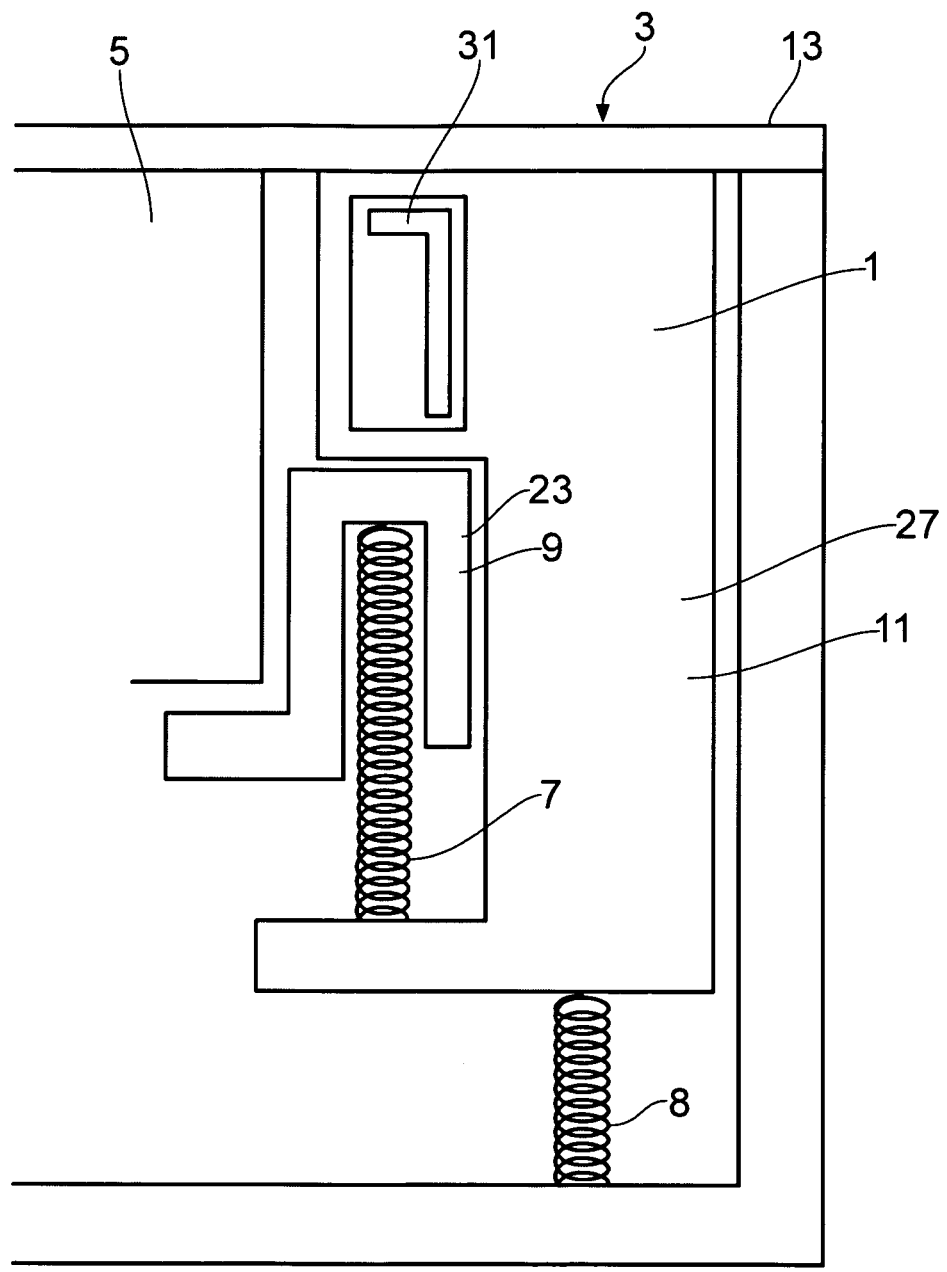
FIG. 6 illustrates an apparatus according to another further embodiment of the disclosure.

FIG. 6 illustrates an apparatus 1 according to another embodiment of the disclosure. As with the embodiments illustrated in FIGS. 1A to 5 and described above the apparatus 1 comprises a mechanism configured to move a card holder 5 between a first position and a second position. The first position may be an open position or a partially open position as illustrated in FIG. 1A and described above. The second position may be a closed position as illustrated in FIG. 1B and described above.

The examplary apparatus 1 illustrated in FIG. 6 is similar to the examplary apparatus illustrated in FIGS. 1A to 5 and described above and so the same reference numerals are used to refer to corresponding features. The examplary apparatus 1 illustrated in FIG. 6 also comprises a sliding mechanism 9 and an adjustment mechanism 11 where the sliding mechanism 9 and adjustment mechanism 11 may be configured to control the position of a card holder 5. The apparatus 1 and card holder 5 may be contained within the casing 13 of a device 3 and the device 3 may be an electronic device such as a wireless communications device or any other suitable device.

In the examplary embodiment of FIG. 6 the sliding mechanism 9 is similar to the sliding mechanism 9 of FIGS. 1A and 1B as described above and comprises to a resilient member 7 which is configured to bias the first sliding portion 23 towards an open position as described above.

In the examplary embodiment illustrated in FIG. 6 the adjustment mechanism 11 comprises a further resilient member 8. The further resilient member 8 may comprise a spring or any other suitable means.

The further resilient member 8 may be coupled to the casing 13 of the device 3 and the second sliding portion 27 of the adjustment mechanism 11. The further resilient member 8 may bias the second sliding portion 27 towards the front of the casing 13 of the device 13. This may adjust the tension in the first resilient member 7.

Figure 7:
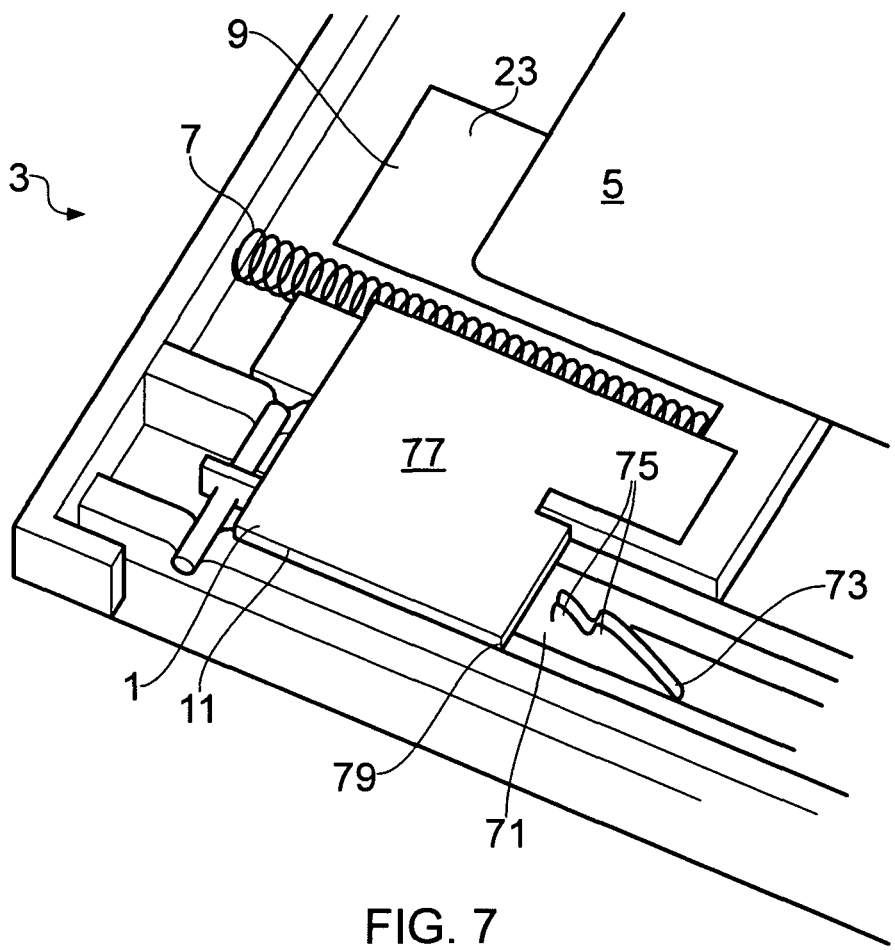
FIG. 7 illustrates an apparatus according to a further embodiment of the disclosure.

FIG. 7 illustrates an apparatus 1 according to another embodiment of the disclosure. As with the embodiments illustrated in FIGS. 1 to 4 and described above the apparatus 1 comprises a mechanism for moving a card holder 5 between a first position and a second position. The first position may be an open position or a partially open position as illustrated in FIG. 1A. The second position may be a closed position as illustrated in FIG. 1B. FIG. 7 illustrates part of the apparatus 1 in a closed position.

The examplary apparatus 1 illustrated in FIG. 7 is similar to the examplary apparatus illustrated in FIGS. 1 to 4 and described above and so the same reference numerals are used to refer to corresponding features. The examplary apparatus 1 illustrated in FIG. 7 also comprises a sliding mechanism 9 and an adjustment mechanism 11 where the sliding mechanism 9 and adjustment mechanism 11 may be configured to control the position of a card holder 5. The apparatus 1 and card holder 5 may be contained within the casing 13 of a device 3 and the device 3 may be an electronic device such as a wireless communications device or any other suitable device.

The apparatus 1 illustrated in the examplary embodiments of FIG. 7 comprises a first sliding mechanism 9, a resilient member 7 and an adjustment mechanism 11. However the embodiment illustrated in FIG. 7 differs from the embodiments illustrated in FIGS. 1 to 4 and described above in that the adjustment mechanism 11 of the embodiment in FIG. 7 comprises a ratchet mechanism 71 rather than a second sliding mechanism 25.

The ratchet mechanism 71 enables the sliding portion 23 to be moved between a plurality of discrete positions rather than slid between a range of positions.

An example of a ratchet mechanism 71 used in the embodiment of FIG. 7 is illustrated in FIGS. 6A to 6D.

Figure 8A:
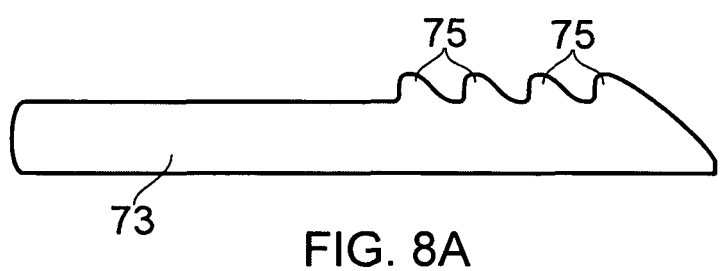
FIGS. 8A to 8D illustrates a ratchet mechanism used in the embodiment of FIG. 7.

The ratchet mechanism 71 comprises at least one ratchet 73. An example of a ratchet 73 is illustrated in FIG. 8A. The ratchet 73 comprises a plurality of teeth 75. In the particular example illustrated in FIGS. 7 and 8A the teeth 75 are rounded. The shape of the teeth 75 may be configured to enable a corresponding engaging portion to move relative to the teeth 75 when enough force is applied.

In the examplary embodiment illustrated in FIG. 7 the ratchet 73 is arranged within the casing 13 of the device 3. In the examplary embodiment the ratchet 73 is positioned parallel to the slide rail of the sliding portion 23. In the examplary embodiment the ratchet 73 is also arranged with the teeth 75 pointing upwards.

Figure 8B:
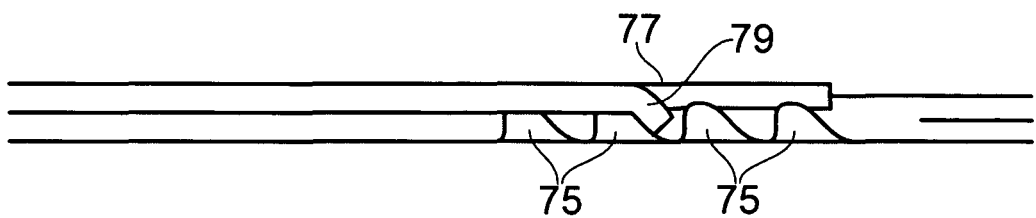

The examplary ratchet mechanism 71 also comprises a pawl 77 as illustrated in FIG. 8B. The pawl 77 comprises a member which is configured to move in the vertical direction. In some embodiments of the disclosure the member of the pawl 77 may comprise a material which is flexible enough to enable the member of the pawl 77 to bend when a user applies sufficient force to the apparatus 1. In other embodiments the pawl 77 or a portion of the pawl may be mounted on a pivot.

In the examplary embodiment of FIG. 8B the pawl 79 comprises an engaging portion 79. The engaging portion 79 may be configured to engage with the teeth 75 of the ratchet 73. When the engaging portion 79 is located between two of the teeth 75 of the ratchet 73 this prevents movement of the pawl 77 relative to the ratchet 73. In particular when the engaging portion 79 is located between two of the teeth 75 of the ratchet 73 this prevents movement of the pawl 77 along a direction parallel to the slide rail of the sliding mechanism 9.

In the examplary embodiment illustrated in FIG. 7 the pawl 77 is coupled to the sliding portion 23. The pawl 77 may be coupled to the sliding portion 23 so that the sliding portion 23 and the pawl 77 move with each other. When the pawl 77 is locked in position this causes the sliding portion 23 to also be locked in position.

Figure 8C:
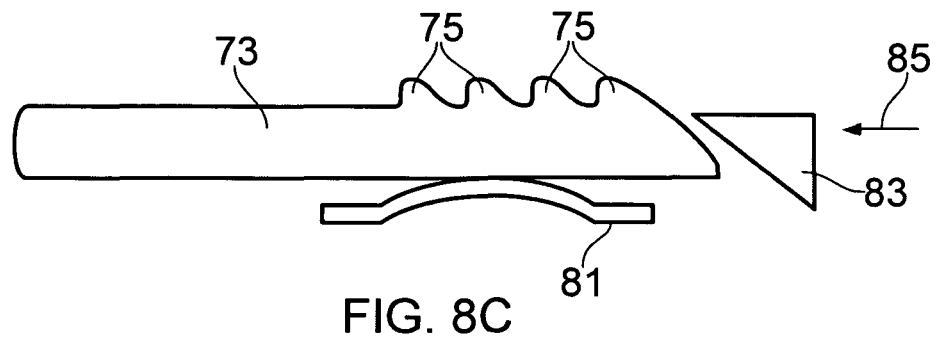

In order to enable the pawl 77 to be released from the locked position illustrated in FIG. 8B an unlocking member 83 is provided adjacent to the ratchet 73 as illustrated in FIG. 8C. The unlocking member 83 is shaped so that when it is pushed in a direction parallel to the length of the ratchet 73, towards the direction indicated by arrow 85, this pushes the ratchet 73 downwards.

In the examplary embodiment illustrated in FIG. 8C a spring plate 81 is provided underneath the ratchet 73. The downwards motion of the ratchet 73 also pushes the spring plate 81 downwards.

When the ratchet 73 is pushed downwards this causes vertical motion of the ratchet 73 relative to the engaging portion 79 of the pawl 77. This releases the engaging portion 79 of the pawl 77 from between the teeth 75 of the ratchet 73 and enables the pawl 77 and the sliding portion 23 to be moved horizontally relative to each other.

When the force applied to the unlocking member 83 is removed the spring plate 81 pushes the ratchet 73 back upwards and enables the engaging portion 79 of the pawl 77 to be engaged between the teeth of the ratchet 73 again.

The unlocking member 83 may be configured to enable a user to apply a force to the unlocking member. The user may be able to apply a force directly or indirectly to the unlocking member 83 so as to enable the user to unlock the ratchet mechanism.

Figure 8D:
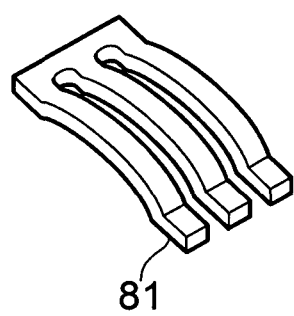
Figure 9:
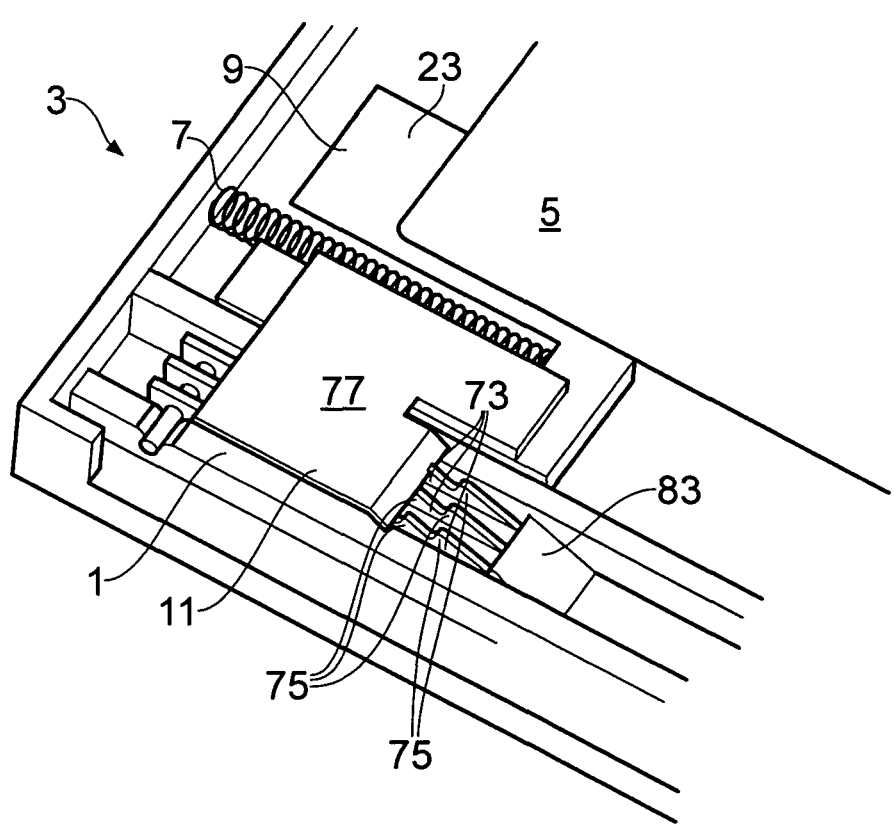
FIG. 9 illustrates an apparatus according to another further embodiment of the disclosure.

FIG. 8D illustrates a spring plate 81 according to an embodiment of the disclosure. The spring plate 81 illustrated in FIG. 8D comprises a plurality of sections and so may be suitable for use with adjustment mechanisms 11 which comprise a plurality of ratchets 73, as illustrated in FIG. 9, for example. In the particular example of FIG. 8D the spring plate 81 comprises three sections and so may be used with an adjustment mechanism 11 which comprises three ratchets 73. In some embodiments of the disclosure the number of sections of the spring plate 81 may be the same as the number of ratchets 73 in the adjustment mechanism 73. In such embodiments each section of the spring plate 81 may be arranged underneath a different ratchet 73.

FIG. 9 illustrates an apparatus 1 according to another embodiment of the disclosure. The embodiment illustrated in FIG. 9 is the same as the embodiment illustrated in FIG. 7 except that in FIG. 7 the adjustment mechanism 11 comprises a single ratchet 73 whereas in FIG. 9 the adjustment mechanism 11 comprises a plurality of ratchets 73.

In FIG. 9 each of the ratchets 73 is the same as the ratchet 73 comprising a plurality of teeth as illustrated in FIG. 8A. In the examplary embodiment of FIG. 9 the plurality of ratchets are arranged parallel to each other but in a staggered configuration so that the teeth 75 are not aligned with the other ratchets. This enables a larger number of locking positions of the pawl 77 to be provided without having to provide ratchets 73 with a finer spacing between the teeth 75.

Embodiments of the disclosure as illustrated in FIGS. 7 to 9 and described above provide for an apparatus 1 where the position of a sliding portion 23 can be adjusted so as to adjust the position of a card holder 5. As with the embodiment illustrated in FIGS. 1A and 1B the first sliding mechanism 9 may be used to enable the card holder 5 to be moved between the open and closed positions and the resilient member 7 may be configured to bias the card holder 5 towards an open or partially open position.

The ratchet mechanisms 71 enable adjustment of the tension within the resilient member 7. In the examplary embodiment of FIGS. 7 to 9 the ratchet mechanism 71 can be used to incrementally move the sliding portion 23 and so either increase or decrease the compression of the resilient member 7. This increases or decreases the tension in the resilient member 7. This enables the position of the first sliding mechanism 23 and the card holder 5 to be adjusted when the first sliding mechanism 23 and the card holder 5 are in a closed position.

Figure 10A:
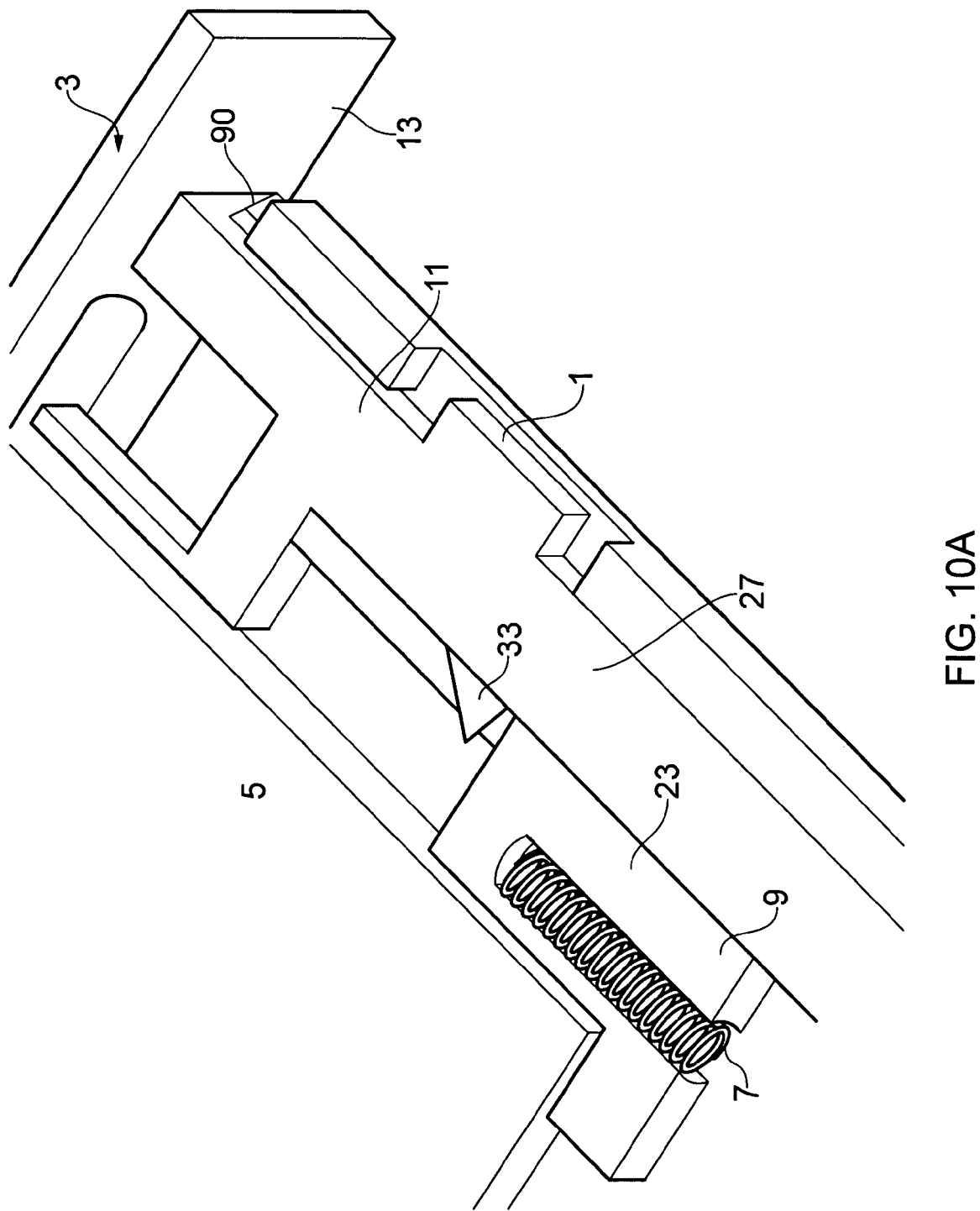
FIGS. 10A and 10B illustrate another embodiment of the disclosure.
Figure 10B:
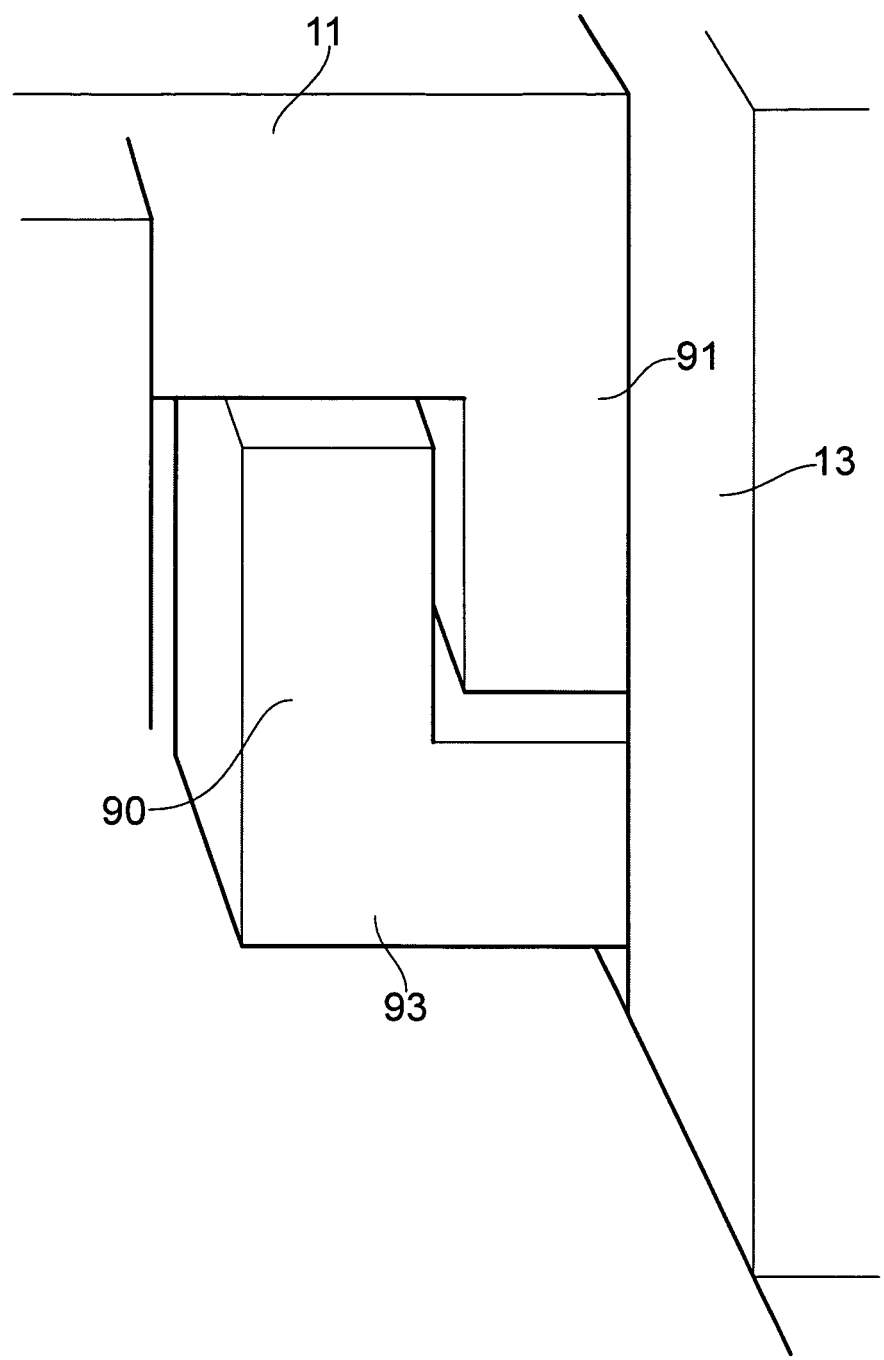

FIGS. 10A and 10B illustrate another embodiment of the disclosure. FIG. 10 illustrates and apparatus 1 according to embodiments of the disclosure where a connecting portion 90 is provided between the casing 13 and the adjustment mechanism 11. FIG. 10B illustrates the connecting portion 90 in more detail.

As with the embodiments illustrated in FIGS. 1A to 9 and described above the apparatus 1 comprises a mechanism configured to move a card holder 5 between a first position and a second position. The first position may be an open position or a partially open position as illustrated in FIG. 1A and described above. The second position may be a closed position as illustrated in FIGS. 1B and 10A and described above.

The examplary apparatus 1 illustrated in FIGS. 10A and 10B is similar to the examplary apparatus illustrated in FIGS. 1A to 9 and described above and so the same reference numerals are used to refer to corresponding features. The examplary apparatus 1 illustrated in FIGS. 10A and 10B also comprises a sliding mechanism 9 and an adjustment mechanism 11 where the sliding mechanism 9 and adjustment mechanism 11 may be configured to control the position of a card holder 5. The apparatus 1 and card holder 5 may be contained within the casing 13 of a device 3 and the device 3 may be an electronic device such as a wireless communications device or any other suitable device. The sliding mechanism 9 and adjustment mechanism 11 and locking mechanism 29 in the apparatus of FIGS. 10a and 10B are similar to those of the embodiment illustrated in FIGS. 1A and 1B although it is to be appreciated that other arrangements could be used in other embodiments of the disclosure.

In the examplary embodiment illustrated in FIGS. 10A and 10B the adjustment mechanism 11 is provided with a hooking portion 91. The casing 13 is also provided with a corresponding hooking portion 93. In the examplary embodiment of FIGS. 10A and 10B the two hooking portions 91, 93 both comprise a right angled or substantially right angled portion.

It is to be appreciated that in other embodiments of the disclosure other shaped hooking portions 91, 93 may be used.

The two hooking portions 91, 93 are arranged to provide a connecting portion 90 between the casing 13 and the adjustment mechanism 11. This may enable the position of the adjustment mechanism 11 relative to the casing 13 to be controlled. The two hooking 91, 93 portions may ensure that the adjustment mechanism 11 and the casing 13 are arranged at a predetermined distance from each other. The position of the adjustment mechanism 11 may be adjusted so that the two hooking portions 91, 93 may be coupled together. This may also adjust the tension in the resilient member 7.

Embodiments of the disclosure as described above may provide mechanisms which may enable the closed position of the card holder 5 to be adjusted. The mechanisms may enable the position of the card holder to be adjusted incrementally or through a continuous range. The mechanisms may enable precise adjustments to be made to the position of the card holder 5 relative to the casing 13 of the device 3.

The adjustment of the position of the card holder 5 may allow for better alignment of the outer portion 17 of the card holder 5 with the casing 13 of a device. The adjustment of the position of the card holder 5 may also allow for better alignment of the contact pads 43 of a card in the card holder 5 with the contact points of a card reader within the device 13.

The adjustment mechanism may enable the position of the card holder to be adjusted to compensate for limitations in manufacturing tolerances of the device 3.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
    a sliding mechanism configured to enable a card holder to be moved between a first position and a second position;
    a resilient member configured to bias the card holder towards the first position; and
    an adjustment mechanism configured to enable tension in the resilient member to be adjusted when the card holder is in the second position wherein the adjustment of the tension in the resilient member enables the second position to be adjusted.

2. The apparatus as claimed in claim 1 wherein the first position is an open position.

3. The apparatus as claimed in claim 1 wherein the second position is a closed position.

4. The apparatus as claimed in claim 1 wherein the apparatus comprises a card holder.

5. The apparatus as claimed in claim 1 wherein the card holder comprises an inner portion and an outer portion where the inner portion is configured to receive a card and the outer portion is configured to form part of the outer surface of a casing.

6. The apparatus as claimed in claim 5 wherein the adjustment mechanism is configured so that when the card holder is in the second position the outer portion of the card reader forms a continuous surface with the outer surface of the casing.

7. The apparatus as claimed in claim 1 wherein second position is adjusted relative to a casing.

8. The apparatus as claimed in claim 1 wherein the adjustment mechanism comprises a sliding mechanism.

9. The apparatus as claimed in claim 1 wherein the slider is configured to be moved between a first position and a second position to adjust the tension in the resilient member.

10. The apparatus as claimed in claim 1 wherein the adjustment mechanism comprises a ratchet mechanism.

11. A device comprising the apparatus as claimed in claim 1.

12. The device as claimed in claim 11 wherein the device is a communications device.

13. The apparatus as claimed in claim 1 wherein the adjustment of the tension in the resilient member enables the alignment of contact pads with a card reader to be corrected.

14. The apparatus as claimed in claim 1 wherein the adjustment of the tension in the resilient member enables the alignment of an outer portion of a card holder with a casing of a device to be corrected.

* * * * *